United States Patent
Deprez (10) Patent No.: US 9,686,585 B2
(45) Date of Patent: Jun. 20, 2017

(54) SYSTEM FOR VERIFYING PHYSICAL PROXIMITY BETWEEN MEDIA CONTENT RECEIVERS

(71) Applicant: SmarDTV S.A., Cheseaux-sur-Lausanne (CH)

(72) Inventor: Olivier Deprez, La Ciotat (FR)

(73) Assignee: SMARDTV S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 14/924,430

(22) Filed: Oct. 27, 2015

(65) Prior Publication Data
US 2016/0127769 A1 May 5, 2016

(30) Foreign Application Priority Data

Oct. 30, 2014 (EP) .................................. 14191164
Jun. 10, 2015 (EP) .................................. 15171421

(51) Int. Cl.
| | | |
|---|---|---|
| H04N 7/20 | (2006.01) | |
| H04N 21/436 | (2011.01) | |
| H04N 21/426 | (2011.01) | |
| H04N 21/438 | (2011.01) | |
| H04N 21/61 | (2011.01) | |
| H04N 21/418 | (2011.01) | |
| H04N 7/16 | (2011.01) | |

(52) U.S. Cl.
CPC ......... *H04N 21/43615* (2013.01); *H04N 7/16* (2013.01); *H04N 7/20* (2013.01); *H04N 21/418* (2013.01); *H04N 21/4263* (2013.01); *H04N 21/42676* (2013.01); *H04N 21/436* (2013.01); *H04N 21/4383* (2013.01); *H04N 21/6143* (2013.01)

(58) Field of Classification Search
CPC ......... H04N 21/43615; H04N 21/6143; H04N 21/4383; H04N 21/4263; H04N 21/42676
See application file for complete search history.

(56) References Cited

U.S. PATENT DOCUMENTS

| | | | |
|---|---|---|---|
| 8,789,115 B2 * | 7/2014 | James ..................... | H04H 40/90 725/64 |
| 2006/0041912 A1 * | 2/2006 | Kuhns ..................... | H04N 7/20 725/71 |
| 2008/0134274 A1 * | 6/2008 | Derrenberger ......... | H04H 40/90 725/131 |

(Continued)

FOREIGN PATENT DOCUMENTS

GB 2377111 A * 12/2002 ............. H04H 40/90

*Primary Examiner* — John Schnurr
(74) *Attorney, Agent, or Firm* — DLA Piper LLP (US)

(57) ABSTRACT

The present invention relates to a system and a device for providing proximity control in a satellite television media content distribution system comprising at least a primary receiver and a secondary receiver, whereby authorization to access the conditional access media content is given if the primary and secondary receivers are verified to be within a single household. The invention uses LNB control signaling, by the primary receiver, to cause the LNB to down-convert signals from pre-determined transponders onto a pre-determined frequency in the L-Band such that the secondary receiver may receive messages thus created through the primary receiver's controlling of the LNB.

19 Claims, 3 Drawing Sheets

(56) References Cited

U.S. PATENT DOCUMENTS

2011/0138438 A1* 6/2011 de Leeuw ........ H04N 21/43615
 725/139
2015/0181275 A1* 6/2015 Zelkowitz .......... H04N 21/4147
 725/70

* cited by examiner

SYSTEM FOR VERIFYING PHYSICAL PROXIMITY BETWEEN MEDIA CONTENT RECEIVERS

CROSS-REFERENCE TO RELATED APPLICATIONS

This application claims the benefit of European Application Nos. 14191164.4 filed Oct. 30, 2014 and Ser. No. 15/171,421.9 filed Jun. 10, 2015. All of the foregoing are incorporated by reference in their entireties.

TECHNICAL DOMAIN

The present disclosure generally relates to the domain of rights management within a broadcast system for distributing content which is subject to conditional access control. The disclosure also relates to the domain of satellite signal distribution over a single coaxial cable, particularly when used in dwelling installations and especially when used in combination with a digital content receiver such as a set-top box or digital television receiver or the like for receiving conditional access content.

STATE OF THE ART

Conditional access digital media content is sometimes sold by satellite TV operators in multi-programme bundles or packages. In some cases, this requires that the operator supply its consumers (i.e. its subscribers) with additional receivers, each additional receiver possibly having an additional smart card. In some cases a subscriber might receive multiple smartcards to be used in one receiver with multiple card readers. The idea is that the consumer is then able to use a particular receiver/smartcard combination to decrypt a particular programme from the bundle. The agreement made between the subscriber and the TV operator however is that the multiple cards are for use within the household of the subscriber only. However, it happens from time to time that a consumer (who is a subscriber) lends or otherwise redistributes a smartcard or receiver/smartcard combination to a further consumer who is not in the same household, thereby breaching the agreement between the subscriber and the operator.

In order to discourage such unscrupulous behaviour by consumers, operators have included different types of proximity control systems into their receiver/smartcard combinations. For example, the operator designates a first of the smartcards supplied to the subscriber as being a primary smartcard and a second as being a secondary smartcard. The system is then configured to periodically check that the secondary smartcard (and possibly its secondary receiver) is always located within a predetermined distance from the primary smartcard (and therefore its primary receiver). When this condition is met it can be considered that both smartcards (and receivers) are being used within the same household.

One such system exists wherein the secondary smartcard comprises a timer which is preset to an initial value and counts towards a predetermined value. When the counter reaches the predetermined value it ceases to provide decryption capabilities until the timer is reset. The timer can be reset by inserting the secondary smartcard into the primary receiver. The expectation is that this provides a sufficient burden on the consumer to dissuade him from providing one of his receiver/smartcard combinations (or just the smartcard) to a further consumer outwith his household. However, this system is not foolproof and it may be complex to manage since it requires that the operator properly track the equipment he distributes (receiver/smartcard combinations).

Another such system exists wherein the primary and secondary receivers are interconnected via a LAN and a round-trip algorithm is used to check the proximity of the two devices—the longer the round-trip takes, the further away the devices are from each other. This is also not an ideal solution since it is not reliable and it adds connectivity costs. Another variation of this technique uses a time-to-live algorithm to check the proximity of the source device and the client device.

Still other systems make use of geo-location techniques in order to verify the proximity between two receivers before allowing protected content to be accessed when the two receivers are close enough to be considered to be within the same household.

Finally, systems exist for verifying the proximity of a first receiver to a second receiver through the use of near-field communications technology (NFC). NFC technology allows for a wireless communication channel to be set up between two NFC-configured devices when the two devices are within a pre-determined distance from each other. The pre-determined distance is usually within some 10's of centimeters. Two smartcards having NFC capability, used as part of the conditional access system, may therefore be used to provide a convenient means for checking whether or not they are within the same household since they will be able to communicate with each other only when they are within the predetermined distance from one another.

Satellite technology is one of the standard means used to deliver media content to consumers. A subscriber generally is equipped with a digital satellite communications system comprising an outdoor unit (ODU), and an indoor unit (IDU). The outdoor unit comprises a satellite dish to capture radio frequency signals coming from a satellite and to reflect the signals towards a focal point where a low-noise block down-converter is located (LNB). The LNB is a combination of a low-noise amplifier to amplify the received microwave signal (i.e. RF signal) from the satellite, a frequency mixer using a local oscillator to down-convert to an intermediate frequency range (IF), and an IF amplifier. The LNB is for amplifying and down-converting a block of the microwave signals received from the satellite (in the 12 GHz range—i.e. within the $K_U$-Band as it is known in the radar technology domain) to a block of intermediate frequencies in a lower frequency range (e.g. in the L-Band)—hence the name "block" down-converter. The LNB usually is suspended from a feed-horn in front of the reflecting satellite dish, at its focus, the focused signal being fed by the feed-horn the LNB's electronics usually via a section of waveguide.

The down-converted signals are then passed towards the IDU via a coaxial cable. The IDU comprises or is otherwise connected to at least one indoor satellite receiver, which could be part of a set-top box, personal computer, laptop computer, media gateway or any other such device for receiving a feed from a satellite dish via a cable. By connected to it is meant electrically connected by wire or wirelessly. The down-conversion process carried out by the LNB allows for the communication path from the ODU to the IDU to be made using a relatively cheap coaxial cable rather than more expensive waveguide technology which would be required had the down-conversion not been performed.

Different parts of the received radio frequency range can be down-converted in the LNB by mixing using different local oscillators. For example, the radio frequency band can be divided into an upper block in the 11.70 GHz to 12.75 GHz range and a lower block in the 10.70 GHz to 11.70 GHz range (frequency ranges which are part of the "$K_U$-Band"). Using a local oscillator of 9.75 GHz, the lower block can be down-converted to an intermediate frequency band of 950 MHz to 1950 MHz, whereas using a local oscillator of 10.60 GHz, the upper block can be down-converted to an intermediate frequency band of 1100 MHz to 2150 MHz. Modern LNBs therefore usually have two or more local oscillators and can be controlled to switch from one to the other. The LNB therefore down-converts blocks from the $K_U$-Band signal to fall within the 950 MHz to 2150 MHz range i.e. within the L-Band as it is known in the domain of radar technology. In satellite TV technology this is known as the Intermediate Frequency Band (IFB) or the BIS Band (Bande Intermédiare Satellite).

Modern LNBs usually have two metal probes (short antennas) which protrude into the waveguide at right angles to each other so that one receives horizontally polarised signals while the other receives vertically polarised signals, which are fed to the LNB. The LNB circuitry is therefore usually configured to be able to switch between the two polarities.

The $K_U$-Band signal received by an ODU is therefore said to be divisible into four quadrants or sub-bands for an LNB having two antennas and two local oscillators: upper frequency band/vertical polarisation; upper frequency band/horizontal polarisation; lower frequency band/vertical polarisation; and lower frequency band/horizontal polarisation. The LNB can be controlled by the IDU, or a receiver comprised therein, to switch between any of the quadrants of the $K_U$-Band. In some cases the $K_U$-Band may be split into more parts than just upper and lower, thereby giving more combinations than just four. LNBs and IDUs, or their related receivers, are now configured to support several transport methods as well as several ODU interface protocols and hardware deployments.

Figure 1:
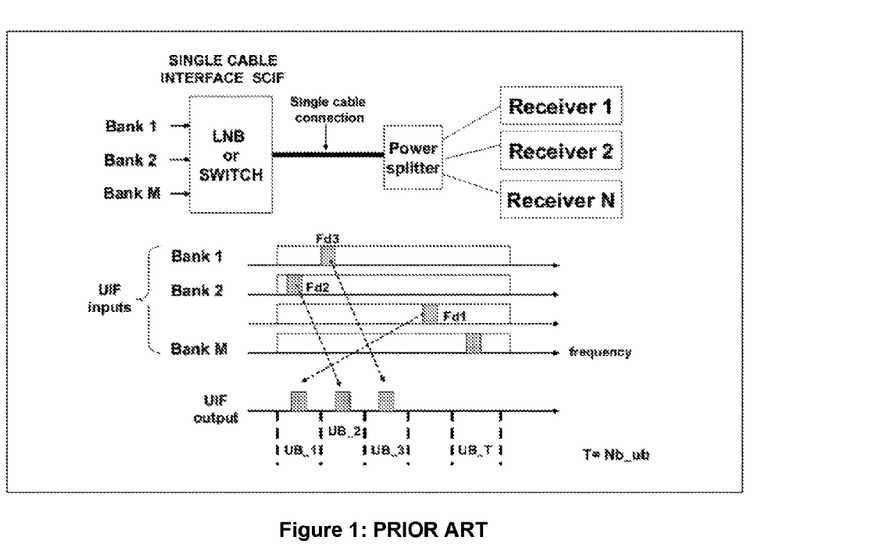
FIG. 1, showing a frequency mapping scenario for a known single coaxial cable satellite communications system in which an embodiment of the present invention may be deployed.

A European industry standard for distributing satellite signals over a single coaxial cable exists and is known as EN 50494. An existing standard known as Unicable Interoperability Platform is open to companies designing and/or marketing satellite and other broadcast-related products. The platform is designed to facilitate the acceptance of Unicable-certified solutions in the consumer TV broadcast market. Many popular satellite TV apparatus for systems in which satellite signals are distributed over a single coaxial cable to multiple receivers are Unicable-certified. The IDUs can control the LNBs using the Digital Satellite Equipment Control protocol (DiSEqC) for satellite television or the Unicable protocol for satellite or terrestrial reception. This allows for several client receivers within a communication system to share a common ODU via a single (shared) RF cable (coaxial cable) and RF splitter. A receiver (or IDU) in the system can therefore issue DiSEqC commands instructing the LNB to deliver the signal from a specific transponder in the $K_U$-Band at a given frequency in the IFB or L-Band, as shown in FIG. 1. A transponder (satellite transponder) is a radio channel with a bandwidth of about 30 MHz. Nowadays, about 8 to 10 channels fit into a DVB multiplex to fill the transponder bandwidth. Multiplexing means combining the bit streams of several digital TV channels into one single bit stream. One single TV channel uses about 4-5 Mbits/s of bandwidth. Using DiSEqC commands, a Unicable LNB can be controlled to down-convert a block of frequencies corresponding to a single transponder.

Power to the LNB is supplied from the IDU via the same coaxial cable used to deliver the IFB signal. This works on a "phantom power" principle thereby eliminating the need for a separate power cable. The different commands which are sent from the IDU to the ODU may be formulated using various combinations of modulating the power supply level between two predetermined values (e.g. 13V and 18V) and by superimposing a modulated 22 kHz tone on the power supply line according to the different protocols given in the DiSEqC standard or whatever other standard is being used. The commands allow for switching from one to other antenna or switching to different channels within the received signal, among others.

Systems exist in the state of the art where an ODU comprises a plurality of LNBs, sometimes referred to as multi-LNBs. Each LNB can provide a signal for an STB and in order to allow for the co-location state of the STBs to be determined (e.g. whether they are in the same house or not) a bridge element is inserted between the two STBs. The bridge element can be controlled by DiSEqC commands to allow two way communication of messages between the STBs. In this way one STB can check whether it is connected by the bridge to another STB by sending a query. If a reply comes it means the STBs are sharing the same bridge. By including the bridge element it is possible to get around the limitation of the DiSEqC protocol whereby only a designated primary STB can initiate communication, thereby allowing for the two-way communication thanks to the bridge.

In view of the prior art, there remains a need to provide a convenient way to send messages from one STB to another within a satellite TV distribution system using a single coaxial cable, preferably using only already-existing components of the system.

BRIEF SUMMARY OF THE INVENTION

The present disclosure relates to implementations of proximity control techniques for verifying that two receivers are close enough to be considered authorised to provide access to conditional access content based on the credentials of a single subscriber. The techniques involve the use of the low-noise block down-converter (or appropriate switch) of a satellite receiver (usually in the outdoor unit (ODU)), especially where it is used to send signals in the Intermediate Frequency Band (IFB) to a primary and a secondary receiver, both receivers normally being within the same household if access is to be authorised, the receivers usually being part of one or more indoor units (IDU). An indoor unit may be a physical module in which its receiver is comprised. Otherwise, an indoor unit may be a virtual module virtual in the sense that it includes more than one receiver within the household or other physical premises, each receiver having or being comprised within its own housing and placed somewhere within the physical premises. Otherwise the IDU may be described as being a connecting module between the outdoor unit and one or more receivers, where the IDU functions as a satellite modem or gateway, delivering signals received on the common cable from the LNB to the one or more receivers. In the present disclosure, the term satellite communications indoor system will be used to mean either an IDU of the state of the art or a system comprising a plurality of indoor satellite receivers connectable to an ODU via a common cable for receiving L-Band satellite communication signals, usually a coax cable. It is worth mentioning that an indoor unit does not necessarily have to be used indoors. It follows that an indoor unit may also be called a consumer premises unit. Another term for a satellite communications indoor system is a satellite communications consumer premises system. Similarly, an outdoor unit is usually installed outdoors, but the word "outdoors" should not be taken to be limiting in the sense that if it is not actually used outdoors it could not be an outdoor unit.

There is described a means and an apparatus to allow a proximity control procedure to be carried out between two indoor satellite receivers (STB) connected to the same satellite dish and forming part of a single home subscription, whereby a communication between the two receivers is set up via the LNB of the ODU in order to facilitate the transmission of rights from one receiver to the other. A proposed solution involves the sending of commands by the primary STB to the LNB to change from one predetermined transponder/frequency to another in a certain sequence, thereby causing one or other from two predetermined transponders to deposit its signal at a predetermined frequency within the L-Band in such a way that the thus-deposited signals can be picked up by the secondary STB and interpreted as messages. In this manner, the primary STB can send authorization messages to the secondary receiver only when the secondary receiver is connected to the same cable for receiving satellite TV content. If the secondary receiver cannot receive the authorization messages, then it will not be enabled to provide access to the content.

To this end, according to a first aspect, provision is made for a primary satellite communications receiver for receiving at least one user-band signal from a plurality of user-band signals within an L-Band of intermediate frequencies via a common cable from a low-noise block down-converter, comprising:

a processor for providing instructions to the low-noise block down-converter via the common cable, the instructions operable to cause the low-noise block down-converter to down-convert, to one or more particular user-band signals, one or more corresponding radio frequency signals from one or more corresponding transponders from a plurality of transponders each providing radio frequency signals at different frequencies within a $K_U$-Band of radio frequencies;

characterised in that:

the processor is further configured to provide further instructions to the low-noise block-down-converter via the common cable, the further instructions operable to successively select either one or another message transponder from a predetermined plurality of message transponders, for down-converting of the selected message transponder's radio frequency signal to one predetermined message user-band within the L-Band of intermediate frequencies, the selection dependent on the values of successive symbols of a pre-determined message comprising a series of symbols, each of the predetermined plurality of message transponders' radio frequency signals being distinguishable from each other and traceable to its respective message transponder.

According to a second aspect, there is provided a secondary satellite communications receiver for receiving at least one user-band signal from a plurality of user-band signals within an L-Band of intermediate frequencies via a common cable from a low-noise block down-converter for down-converting, to the L-Band of intermediate frequencies, a plurality of radio frequency signals from a plurality of transponders each providing radio frequency signals at different frequencies within a $K_U$-Band of radio frequencies, the secondary satellite communications receiver comprising:

at least a first tuner for selectively receiving at least a first user-band signal from the plurality of user-band signals;

at least a first demodulator for demodulating the selected first user-band signal;

at least a first decoder for decoding at least the demodulated first user-band signal to provide a first transport stream; and a processor for processing at least the first transport stream;

characterised in that:

the secondary satellite communications receiver is further configured to:

receive a further user-band signal from the plurality of user-band signals at a pre-determined message user-band within the L-Band of intermediate frequencies via the common cable from the low-noise block down-converter;

demodulate, decode and process the further user-band signal to obtain a plurality of further transport streams;

trace each one from the plurality of further transport streams to one from a plurality of pre-determined message transponders within the plurality of transponders, each message transponder corresponding to a predetermined symbol; and reconstruct a message comprising a series of successive symbols corresponding to the traced message transponders.

According to a third aspect, provision is made for a satellite communications indoor system comprising:

a common cable for receiving an L-Band of intermediate frequencies from a low-noise block down-converter, the L-Band of intermediate frequencies comprising one or more user-band signals from a plurality of user-band signals;

a primary satellite communications receiver as described above, the primary satellite communications receiver configured to receive at least a first user-band signal from the plurality of user-band signals via the common cable; and a secondary satellite communications receiver as described above, the secondary satellite communications receiver configured to receive at least a second user-band signal and a message user-band signal from a plurality of user-band signals via the common cable;

wherein the secondary satellite communications receiver is configured to switch, at pre-determined intervals, from receiving the second user-band signal to receiving the message user-band signal.

Provision is further made, according to a fourth aspect, for a satellite communications indoor system comprising:

a common cable for receiving an L-Band of intermediate frequencies from a low-noise block down-converter, the L-Band of intermediate frequencies comprising one or more user-band signals from a plurality of user-band signals;

a primary satellite communications receiver as described above, the primary satellite communications receiver configured to receive at least a first user-band signal from a plurality of user-band signals via the common cable; and a secondary satellite communications receiver as described above, the secondary satellite communications receiver configured to receive at least a second user-band signal and a message user-band signal from a plurality of user-band signals via the common cable.

According to a fifth aspect, there is provided a satellite communications indoor system comprising:
- a common cable for receiving an L-Band of intermediate frequencies from a low-noise block down-converter, the L-Band of intermediate frequencies comprising one or more user-band signals from a plurality of user-band signals;
- a primary satellite communications receiver as described above, the primary satellite communications receiver configured to receive at least a first user-band signal from a plurality of user-band signals via the common cable; and
- a secondary satellite communications receiver as described above, the secondary satellite communications receiver configured to receive at least a second user-band signal and a message user-band signal from a plurality of user-band signals via the common cable.

According to a sixth aspect, provision is made for a satellite communications system comprising a plurality of satellite transponders configured at least to transmit radio frequency signals at different frequencies within a $K_U$-Band of radio frequencies;
characterised in that:
- said plurality of satellite transponders includes at least two to the power n ($2^n$) predetermined message transponders each configured to transmit signals which allow for each of the message transponders to be uniquely identified, where n is a non-negative integer.

In a single cable satellite communication reception system, provision is made, according to a seventh aspect, for use of a primary satellite communications receiver as described above to send control signals via a common cable to control a low-noise block down-converter to down-convert $K_U$-Band signals from a plurality of predetermined message transponders to a pre-determined message user-band within an L-Band of intermediate frequencies on the common cable for the purpose of constructing a message receivable by a secondary satellite communications receiver from the common cable.

Use of a secondary satellite communications receiver described above is provided for according to an eighth aspect, to receive a signal at a pre-determined message user-band within an L-Band of intermediate frequencies on a common cable within a single cable satellite communications reception system and to demodulate and decode the signal to retrieve a security message, the signal being a modulated signal based on down-converted $K_U$-Band signals from a plurality of predetermined message transponders.

In a satellite communications indoor system as described above, according to a ninth aspect of the present invention, a method is provided for enforcing an authorization policy which requires a physical proximity condition between a first receiver and a second receiver to be met for access to a received content to be granted, the method comprising:
- receiving a content from the common cable at a first user-band by the second receiver;
- programming the low-noise block down-converter, by the first receiver via the common cable, to generate a modulated signal on the common cable at a pre-determined message user-band by selectively switching between at least two message transponders based on the values of successive symbols of the authorization message, the first and second message transponders transmitting signals which can be distinguished from each other and traceable to their respective transponders;
- decoding, by the second receiver, the modulated signal to recover the authorization message;
- providing the second receiver access to the received content only if the second receiver receives the authorization message.

Systems which provide proximity control functionality usually involve periodically checking that a secondary smartcard or receiver is located within a predetermined distance from the primary smartcard or receiver. As discussed above, systems existing in the state of the art include those wherein: a timer in the secondary smartcard must be periodically reset by physically placing the secondary smartcard in the primary receiver; a round-trip algorithm is used to verify that the receivers are on a same LAN; a geo-location technique is used; or NFC technology is used. None of these solutions involve sending security messages from the primary receiver to the secondary receiver via the same single cable that may be used for receiving broadcast content. A system in which an embodiment of the present invention is deployed would therefore display a characteristic whereby the output of at least one tuner of the secondary receiver would at least periodically comprise content which alternates between a plurality of transponder signals in a manner which indicates that it is not providing broadcast content which is suitable for viewing. Similarly, monitoring of the single cable would show that the primary receiver at least periodically sends transponder selection commands to the LNB at a rate which indicates that such switching cannot be useful for allowing a single broadcast content to be viewed.

BRIEF DESCRIPTION OF THE DRAWINGS

The present invention will be better understood thanks to the detailed description which follows and the accompanying drawings, which are given as non-limiting examples of embodiments of the invention, namely.

DETAILED DESCRIPTION

The present disclosure relates to the use of an LNB of a satellite television system to provide proximity enforcement, where the proximity of a primary receiver and at least one secondary receiver is verified before allowing access to content received by the secondary receiver via the satellite communications network. Access is only authorised when the primary and secondary receivers are within a predetermined distance from each other. The predetermined distance is usually of an order which allows the content owner or operator to consider the two receivers to be within a same household. In the context of the present invention, proximity is taken to mean nearness in space i.e. physical proximity. If the secondary receiver receives the content while it is not within the required distance from the primary receiver, even if the content is received via the satellite communications network, then access should not be authorised. By content it can mean content which is protected by conditional access means and which is therefore usually encrypted or content which is not encrypted (e.g. free-to-air or plaintext content) but for which it is necessary to prove compliance with the proximity requirement rules to be able to play or otherwise provide access to the content. In the first case, the secondary receiver comprises a conditional access module, which can withhold the rights to access the content until the proximity requirement rule is met. In the second case, when the content is not encrypted, the proximity requirement rule can be enforced by any means suitable to disallow at least the display of the content. For example, receivers which are to be used as secondary receivers in the context of the present invention could be equipped with a means for disabling the output when the proximity condition is not met or a means for disabling any of the functions necessary in the processing of the received content.

The state of the art in satellite signal distribution over a single coaxial cable in single dwelling installations includes systems comprising an outdoor unit and an indoor unit, the outdoor unit (ODU) including a satellite receiver with an LNB and the indoor unit (IDU) comprising one or more receivers connected to the LNB via the single (shared or common) coaxial cable. Otherwise the IDU may be connected to the one or more receivers, where the IDU functions as a satellite modem and distributes the signal from the LNB to the receiver or receivers. The bandwidth of the shared coaxial cable between the outdoor unit and receivers associated with the indoor unit is divided into slots. The number of slots (Nb_ub) varies from one application to another and is a characteristic of the single cable interface (SCIF).

The word receiver, in the present disclosure, is taken to mean an electronic device integrating at least a tuner and, usually, a demodulator. Generally, at a consumer's premises, equipment exists for realising all functions for demodulating and decoding received satellite signals. This equipment may be housed in a cabinet and comprise a plurality of receivers. As shown in FIG. 1, there may be a power splitter between the shared coaxial cable and the plurality of receivers within or connected to the IDU. When a power splitter is used, say with one input for receiving the LNB signal and four outputs for sending the LNB signal to four receivers, each of the four outputs may be considered to be electrically equivalent to the input. In other words, even when a power splitter is used, it can be said that each of the receivers share the common cable connected to the LNB. Examples of a receiver include a set-top box (STB) or an integrated digital TV.

Each receiver is assigned a UB slot (usually by tuning means). Each receiver then operates at a single frequency according to the UB slot it was assigned. Re-assignments are possible in the sense that the single frequency at which a particular receiver operates is not fixed for the lifetime of the receiver but may be programmable. To select a desired channel (transponder signal) the receivers can send SCIF control signals (and/or switch control signals) providing information such as bank selection frequency (band, feed, polarisation), of the desired signal and designated UB slot, for example. FIG. 1 shows a general system configuration and UB slot frequency mapping scenario, illustrating the frequency mapping for such a single coaxial cable distribution system. In the figure, Bank1, Bank2, ... to BankM represent satellite signals coming from different transponders (which can all be on one satellite or over more than one satellites) and occupying different frequency ranges within the $K_U$-Band (different banks). The different transponders can transmit different channels or feeds within their transmitting range and the figure shows each of them with a different feed (Feed1, Feed2, Feed3) being transmitted in a different part of the $K_U$-Band (KUB). According to one embodiment, four transponders transmit four channels in 4 different quadrants from the $K_U$-Band as signals Bank1, Bank2, Bank3 and Bank4, for example. The low-noise block down-converter, or switch, (LNB or SW) of the single cable interface (SCIF) converts each feed down to a different part of the Intermediate Frequency Band (IFB) corresponding to the pre-determined user-bands or slots (UB_1, UB_2) for the different receivers (Receiver1, Receiver2, ReceiverN) connected to the single cable connection (SC). A power splitter (PS) may be used between the single cable and each receiver. Some power splitters allow bi-directional distribution of DC and RF signals to enable commands from the receivers to the LNB as well as from the LNB to the receivers.

SCIF control signals or commands (or switch controls), as mentioned above, may be issued by receivers according to the DiSEqC format. A receiver can thereby issue a DiSEqC command instructing the ODU to deliver the signal from a specific transponder in the $K_U$-Band to a given frequency (band of frequencies) in the L-Band.

Given this known means for allowing a receiver to influence the behavior of the LNB or switch, the present disclosure relates to the use of this means to establish a communication link between a primary receiver (RX1) and at least one secondary receiver (RX2) which share the same coaxial cable within a system for satellite signal distribution over a single coaxial cable. RX1 and RX2 are therefore said to be satellite communications receivers.

In a system comprising two receivers for example, one receiver may be designated as being the primary receiver while the remaining receiver would be designated the secondary receiver. According to an embodiment of the present invention, the primary receiver and the secondary receiver agree on a particular frequency within the Intermediate Frequency Band (IFB) upon which the primary receiver will make information available to the secondary receiver. The information will be interpretable by the secondary receiver. The particular frequency which is decided agreed upon is referred to here as the IFB Message Frequency since it is a frequency in the IFB which will be used to communicate data between receivers on the same cable. This may also be called the message user-band. The ODU (using one or more LNBs and possibly a switch or switch matrix) transposes blocks of the $K_U$-Band, received from one or more transponders on a given satellite (or satellites), into blocks within the IFB, as described in the State of the Art Section above. However, according to the embodiment, by providing for the primary receiver to instruct the ODU to down-convert blocks from particular transponders to the agreed IFB Message Frequency, messages can be constructed at the IFB Message Frequency which will be readable by the secondary receiver. The instructions for controlling the LNB can be given using DiSEqC commands or any other known protocol for communicating from a receiver to an LNB. The primary receiver usually has a processor for handling the LNB control features.

A typical Unicable system can be adapted to include an embodiment of the present invention. For example, in a Unicable system, signals received from four different transponders may be down-converted to a single satellite channel router output connected to a single coaxial cable connected to the indoor satellite receivers (primary and secondary receivers). The down-converted signal has four user-bands, UB_1, UB2, UB_3 and UB_4. According to the embodiment, one of the user-bands is designated (agreed upon between the primary and secondary receivers connected to the single coaxial cable) as being a user-band for sending messages from the primary receiver to the secondary receiver—a message user-band. A message shall be understood to be a series of characters or symbols. Therefore, by sending a succession of symbols from the primary receiver to the secondary receiver, a message can be sent. One of the transponders will be designated as being Transponder0 for formulating a "0" symbol at the message user-band and another will be designated as being Transponder1 for formulating a "1" symbol at the message user-band. In this way the primary receiver can build up messages by controlling the LNB to switch between Transponder0 and Transponder1 as required. A message is a series of symbols. The secondary receiver will be able to detect which of the two Transponders, Transponder0 or Transponder1 is down-converted to the message user-band at any given time. According to one embodiment this recognition may be derived by the secondary receiver demodulating the signal at the message frequency (IFB Message Frequency) and then further decoding the demodulated signal to obtain a transport stream and further reading the transport stream ID from a data packet within the transport stream (usually from the packet header). Since Transponder0 and Transponder1 transmit transport streams having different, known, transport stream IDs, the secondary receiver knows if a "0" symbol or a "1" symbol has been received by checking the transport stream ID. By successively checking for these symbols, the secondary receiver can build up the message.

According to embodiments of the present invention, transponders which have been designated as being usable for formulating the messages as described above may still be used to transmit content in the normal way. In this case the primary receiver instructs the LNB to switch between the designated transponders and down-convert to the message user-band only for the duration required to formulate a message, while the rest of the duration the transponder is available to down-convert in the normal way to any of the other user-bands.

A receiver may be designated as a primary receiver by programming its state or mode as such. Similarly, the receiver may be designated as a secondary receiver by programming its state or mode as such. A master-slave relationship exists between primary and secondary receivers whereby the primary receiver can issue messages for the attention of any or all of the secondary receivers. According to an embodiment, it is the operator who decides on which receivers can be primary receivers and which can be secondary receivers. As such, the receivers may be pre-hardwired or otherwise one-time configured by the operator to be primary or secondary receivers. Thus, a user who subscribes to a service from the provider where such service allows for the user to receive first content using a first receiver or a first smartcard or similar conditional access means, and second content using a second receiver, smartcard or similar means, usually at a preferential tariff, under the condition that the two receivers are used within the same household, may be supplied with a first receiver pre-configured as a primary receiver and a second receiver pre-configured as a secondary receiver. The secondary device may be paired with the primary receiver. Advantageously, when a secondary receiver is paired with a primary receiver, it may be paired with one and only one primary receiver. Pairing involves sharing an identifying parameter of the primary receiver with the secondary receiver. This is described later in the present disclosure.

According to other embodiments, applicable in systems where the received content is not encrypted, the secondary receiver does not need to have a conditional access module. Instead, access to the content can be blocked by any other means when the proximity requirement is not met. For example, the output may be disabled or a decoding function may be disabled or any of the functions used in processing the received content may be disabled or otherwise blocked.

In an exemplary system for satellite signal distribution over a single coaxial cable in which an embodiment of the present invention may be deployed, an ODU comprising a Universal LNB having two input probes at right angles and two selectable local oscillators is connected, via a common cable (usually coax), to a primary receiver and a secondary receiver (both indoor satellite receivers). The ODU accepts DiSEqC commands allowing for a receiver to control the LNB to down-convert blocks from any of the four quadrants of the $K_U$-Band into the IFB (or L-Band). In this example, the primary receiver has set up the LNB to down-convert a first channel from a first transponder transmitting at a first frequency in the high, vertical quadrant of the $K_U$-Band to a first frequency in the IFB, while the secondary receiver has set up the LNB to down-convert a second channel from a second transponder transmitting at a second frequency in the high, horizontal quadrant of the $K_U$-Band to a second frequency in the IFB. According to an embodiment of the invention, the primary receiver selects another two available transponders in order to have them both down-convert, when selected, to the agreed IFB Message Frequency. The two latter transponders shall be used to formulate one or more symbols at the IFB Message Frequency. Since a series of symbols makes up a message, these transponders shall be referred to as message transponders. According to another embodiment it is not the primary receiver which selects the message transponders: instead there are two predetermined message transponders, one representing a zero and one representing a one. For example, this could be a Transponder0 transmitting at frequency F0 somewhere in the high, vertical quadrant of the $K_U$-Band and a Transponder1 transmitting at frequency F1 somewhere in the high, horizontal quadrant of the $K_U$-Band. It is worth noting that although the transponders of the example cited here are all within different quadrants of the $K_U$-Band, this does not necessarily have to be the case. For example, they could be four different frequencies from the same quadrant or any other combination of frequencies and quadrants. The receivers are thus set up to receive broadcast content at their respective user-bands as normal and, by issuing commands to the LNB to control switching between Transponder0 and Transponder1 in a controlled manner, the primary receiver can selectively control the LNB to deliver signals from Transponder0 or Transponder1 in turn to the IFB at the agreed-upon IFB Message Frequency. In this manner, the primary receiver can code messages (series of symbols) onto the IFB Message Frequency, which will be readable by the secondary receiver as long as it can determine which of Transponder0 or Transponder1 was used at any given time to down-convert to the IFB Message Frequency.

According to embodiments of the invention then, two transponders are chosen for the purpose of creating messages at the IFB Message Frequency: in this example Transponder0 and Transponder1. When the primary receiver wants to code a "0" character, it requests the LNB, using DiSEqC commands for example, to tune to Transponder0 and to down-convert to the IFB Message Frequency. Similarly, when the primary receiver wants to code a "1" character, it requests the LNB to tune to Transponder1 and down-convert to the IFB Message Frequency. The secondary receiver can tell which of the two transponders has been used at any given time to down-convert its signal to the IFB Message Frequency by demodulating the signal and inspecting at least part of the transport stream thus obtained. For example, by inspecting the transport stream ID the secondary receiver can tell which of Transponder0 or Transponder1 was being down-converted at any given time. Using this technique of periodically switching between two predetermined message transponders in order to have them deliver their down-converted $K_U$-Band signals to the massage band in the IFB, a succession of phases can be built up. During each successive phase, down-converted signals from either one or other of the message transponders will appear at the message user-band. Since a receiver can demodulate and decode the signal at the message user-band during each of the phases, thereby being able to identify whether the signal came form one or other of the message transponders, the receiver can interpret the successive phases of thus-identified ones or zeros as forming a message. In this way, a primary receiver can successively build up a message over a number of phases in a way in which a secondary receiver is able to decode the message since one symbol is coded per phase and a series of symbols makes up a message.

Messages sent from the primary receiver to the secondary receiver according to embodiments of the present invention may be arranged to function as security messages. Such security messages may be used to authorise the secondary receiver to decode or otherwise descramble content or to continue to decode or otherwise descramble content. According to one embodiment, the message may be the current time and it may further be authenticated using a private key, or other datum, pertaining to the primary receiver for example. Such messages from the primary receiver may only be received by the secondary receiver if the primary and secondary receivers share the same LNB, indicating that they must be connected to the same coaxial cable. This is usually sufficient to satisfy the condition whereby the secondary receiver has to be within the same household as the primary receiver according to the agreed subscription requirements, thereby authorising the secondary receiver to decode or decrypt the content. The secondary receiver could have prior knowledge of the primary receiver's public key (in a memory for example) and can check the validity of the authenticated time datagram (in this case the datagram of the current time) communicated in the manner described above. The primary receiver public key could be provided to the secondary receiver beforehand, using known EMM messaging technology for example.

Techniques such as this, where a secondary receiver has prior knowledge of the primary receiver's public key are known in the domain of cryptography where "pairing" operations are performed. In pairing, two devices establish a relationship by creating a shared secret known as a link key. If both devices store the same link key, they are said to be paired. A device that wants to communicate only with a paired device can cryptographically authenticate the identity of the other device, ensuring it is the same device it previously paired with. Once a link key is generated, an authenticated Asynchronous Connection-Less (ACL) link between the devices may be encrypted to protect data exchanged data against eavesdropping. It can therefore be said that a system in which an embodiment of the present invention is deployed may comprise a primary receiver and a secondary receiver, the primary and secondary receivers being cryptographically paired.

Figure 2:
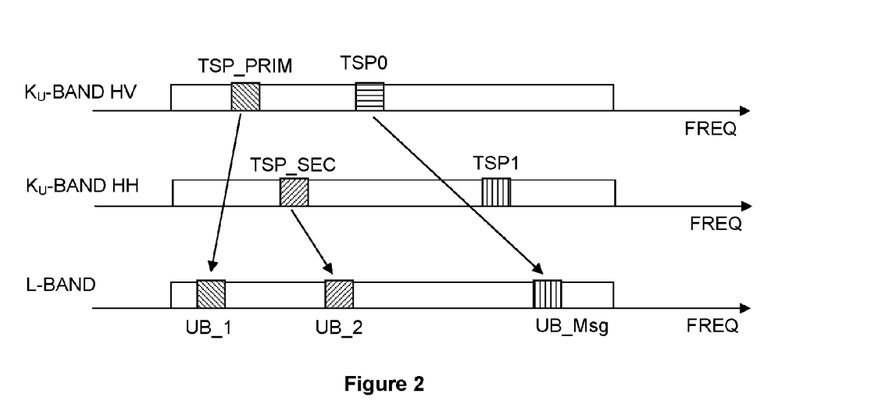
FIG. 2, showing how a 0 symbol may be coded according to an embodiment of the present invention.
Figure 3:
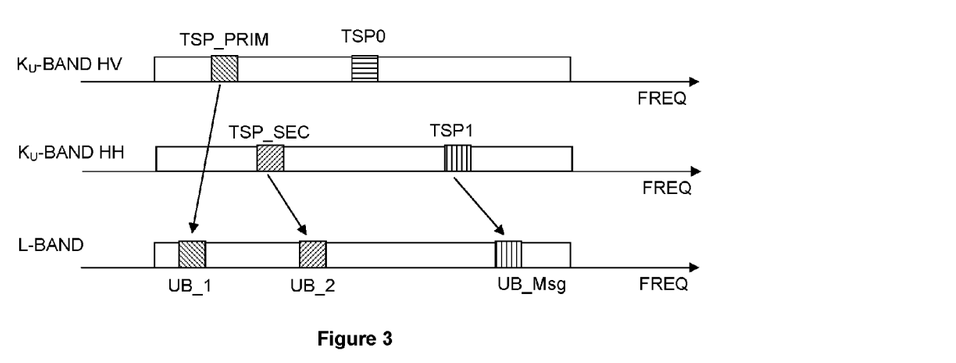
FIG. 3, showing how a 1 symbol may be coded according to an embodiment of the present invention.

FIG. 2 shows how a "0" character may be coded using a system adapted according to an embodiment of the present invention, while FIG. 3 shows how a "1" character may be coded, again using commands for the LNB, in the system adapted according to the embodiment of the present invention. According to one embodiment, a signal received from a first transponder (TSP_PRIM), transmitting a first broadcast content, is down-converted to a first part of the IFB (UB_1); and a signal received from a second transponder (TSP_SEC), transmitting a second broadcast content, is down-converted to a second part of the IFB (UB_2). In the example of FIG. 2, TSP_PRIM represents a transponder which is intended to transmit live content to a primary receiver, while TSP_SEC represents a transponder which is intended to transmit live content to a secondary receiver. It is the intention of an operator of the system, or the owner of the two contents, to grant a user access to live content from TSP_SEC only if that user has both the primary receiver and the secondary receiver within the same (physical) premises. A third signal from a third transponder (TSP0), designated to represent a "0" character, may be down-converted to the agreed-upon IFB Message Frequency (UB_Msg); and a fourth transponder (TSP1), designated to represent a "1" character, may also down-converted to the agreed-upon IFB Message Frequency (UB_Msg). The primary receiver controls the LNB to switch, at a predetermined message bit-rate (or symbol rate), between the third and fourth transponders, dependent on the values of successive bits forming an n-bit message, thereby down-converting the signals from one or other of the third or fourth transponders to the agreed-upon IFB message frequency, resulting in a modulated signal appearing at the IFB message frequency over n-phases, the modulated signal comprising n-phases made up of successive down-converted signals from either or both of the third transponder and the fourth transponder. The secondary receiver is then able to decode the message by demodulating the signal at the IFB message frequency during each of the successive phases and identifying, during each phase, from which transponder the signal came, thereby successively reconstructing the message over the n-phases.

According to an embodiment of the present invention, a single cable satellite communications indoor reception system is provided, comprising a single cable, a primary receiver for receiving L-Band signals from the single cable and a secondary receiver for receiving L-Band signals from the single cable. The primary receiver is configured, as described above, to send commands to the LNB of the outdoor unit to select certain transponders and have their $K_U$-Band signals down-converted to a particular user-band. The system is configured such that the two receivers receive the L-Band signal from the common cable. According to a first variation, the LNB is already configured to down-convert a first transponder signal to a first user-band for the primary receiver and to down-convert a second transponder signal to another user-band for the secondary receiver. In other embodiments the primary receiver is configured to send the necessary commands to the LNB to set it up in the manner just described. In any of the variations, the primary receiver is further configured to send commands to the LNB to down-convert the signals from two or more message transponders to a particular message user-band in the L-Band, as described above. In this manner, the LNB continuously down-converts a first signal with a first content to a first user-band for the first receiver, a second signal with a second content to a second user-band for the secondary receiver and the signals from two or more message transponders to a message user-band in such a way that a signal from one message transponder will be followed by a signal from another message transponder according to the values of successive bits of a predetermined message value stored in or otherwise known by the primary receiver. Each of the message transponders are associated with different predetermined codes. For example if there were two message transponders, then they may be associated with codes 0 and 1, respectively. For four message transponders, they could correspond to codes 00, 01, 10 and 11, respectively. The message has a finite length. Once the message bits have all been used to formulate the commands for switching the LNB between message transponders, the primary receiver can repeat the commands so that the LNB can perform the switch in a looped fashion. This way, it is arranged for the message to appear continuously, or at least periodically in a looped fashion, on the common cable at the message user-band. It may be arranged for the message to have a predetermined synchronising byte so that a receiver who receives the message can know where the message begins and ends. A secondary receiver sharing the same common cable, can then receive the signal at the message user-band, demodulate the signal and decode the demodulated signal to find which transponder from the two or more pre-determined message transponder delivered the signal. The signal will change with time according to which transponder signal appears at the message user-band at any given time. Since each predetermined message transponder corresponds to a particular code, the secondary receiver can reconstruct a message by successively concatenating the codes associated with whichever transponder sent its signal. The secondary receiver can therefore reconstruct the message thus sent by the primary receiver. The message may appear in looped fashion. The secondary receiver knows how to find the start of the message, for example by finding a known synchronisation byte within the message. This system may be used to enforce an access policy which requires the physical proximity of a secondary receiver to a primary receiver in order to be authorised to decrypt content received at the second user-band. As part of the requirements for receiving the authorization, the secondary module has to provide the message sent from the primary receiver. Furthermore, the secondary receiver has to prove, at predetermined intervals, that it is still within a predetermined physical proximity of the primary receiver. The pre-determined interval may either be preset in the secondary receiver or it may be provided, via the message from the primary receiver. The secondary receiver may comprise a timer for counting the pre-determined interval or it may be able to receive the time from a signal from one or more transponders and be configured to calculate when the pre-determined interval has elapsed. At the pre-determined interval, or at some time before the pre-determined interval elapses, the secondary receiver receives the message at the message user-band from the primary receiver. In embodiments wherein the secondary receiver has only one tuner, the secondary tuner has to poll between receiving programming content at the selected user-band to receiving the message at the message user-band, thereby having to interrupt reception of the programming content at least for the length of time required to receive and decode the message. In embodiments where the secondary receiver has more than one tuner, it may continuously receive both the programming content and the message.

Figure 4:
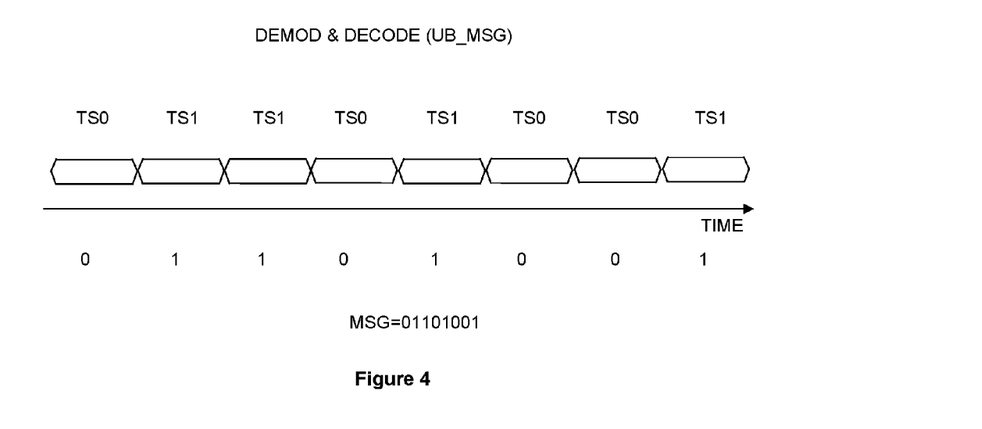
FIG. 4, showing how a modulated signal at the message user-band in a common cable may be decoded to detect a security message according to an embodiment of the present invention.

FIG. 4 shows how a modulated signal on the common cable according to embodiments of the present invention may look in the time domain. After demodulating and decoding of the intermediate frequency signal at the message user-band by the secondary receiver a modulated signal may be represented by the timing diagram of FIG. 4, where during a period where a security message has been encoded at the message user-band by the primary receiver, a series of successive phases in the time domain can be seen, each phase having transport stream information coming from either the "0" message transponder (TSP0) or the "1" message transponder (TSP1). (In this context, by "modulated" it means modulated by successive bits of an n-bit message such that parts of transport streams from either TSP0 or TSP1 appear at each successive phase of the message period). In FIG. 4, it can be seen that, during the message period, a part of transport stream 0 (from TSP0) appears during a first phase, then during a second phase part of a transport stream from TSP1 appears, and so on until the 8 phases within the message period have been received. The secondary receiver, recognising from which transponder each partial transport stream comes—for example by inspecting the transport stream ID—can deduce that the primary receiver must have used a message "01101001" to cause the LNB to select one or other of the message transponders for down-converting their signals to the message user-band. Consequently it has received the message "01101001" from the primary receiver. This message could be an authorization key allowing it to access content received at UB_2 (see FIG. 1 or 2) or it could include a counter reload value indicating how long before the secondary receiver has to re-perform a step of validating whether or not it is still authorised to access content. In this way, secondary receiver will only be able to access content received by it as long as it is sharing the same common cable with the primary receiver.

The third and fourth transponders may be "normal" transponders in that they transmit valid broadcast content e.g. pertaining to different channels or programmes. According to embodiments of the invention it is only necessary for the secondary receiver to be able to distinguish between the down-converted signals from each of the transponders. This may be achieved through transport stream IDs for example since each of the transport streams which are decoded after demodulation of each of the down-converted signals will have different transport stream IDs. The secondary receiver just has to know which one represents a 0 and which one represents a 1. This can be predetermined somewhere within the system and agreed between the primary and secondary receivers.

The primary receiver may have a single tuner for receiving broadcast content (from the first transponder, for example) at the first part of the IFB, while the secondary receiver (perhaps a PVR for example) may have two tuners: one for receiving broadcast content at the second part of the IFB (from the second transponder) and one for receiving the signal which forms the message from the primary receiver (formulated using the third and fourth transponders) at the IFB Message Frequency. Such a configuration would allow for communication of messages from the primary receiver to the secondary receiver without disruption of the received broadcast content (from the second transponder) since the second tuner of the secondary receiver may be dedicated to listening for authorization messages coming from the primary receiver. According to another embodiment, the secondary receiver may have only one tuner. In such a configuration the transmission of messages from the primary receiver and the reception of the messages by the secondary receiver could lead to some disruption of the broadcast content because the IFB message frequency onto which the two message transponders' signals will be modulated will have to be the same as the user-band for the secondary receiver's reception of content.

In a system in which an embodiment of the present invention is deployed, there is a pre-arranged agreement on a symbol rate. The symbol rate is related to the "phases" mentioned before, in that the phase is the reciprocal of the symbol rate. The primary receiver then arranges for the switching between the alternate transponders for placing "0" or "1" characters or symbols at the IFB Message Frequency at the agreed symbol rate. For example, the symbols may change every second. The primary and secondary receivers would then lock their internal clocks to the TDT information (Time and Data Table—one of the Service Information Tables (SI) within a DVB transport stream) from a time trusted transponder, which could be one or both of the already described symbol-coding (or message) transponders (Transponder0, Transponder1). In this context, changing the presently coded character means tuning to the alternate transponder when the next symbol is to be the opposite from the last symbol or remaining tuned to the current message transponder when the next symbol is to be the same as the present symbol, this being performed at the chosen symbol rate.

Figure 5:
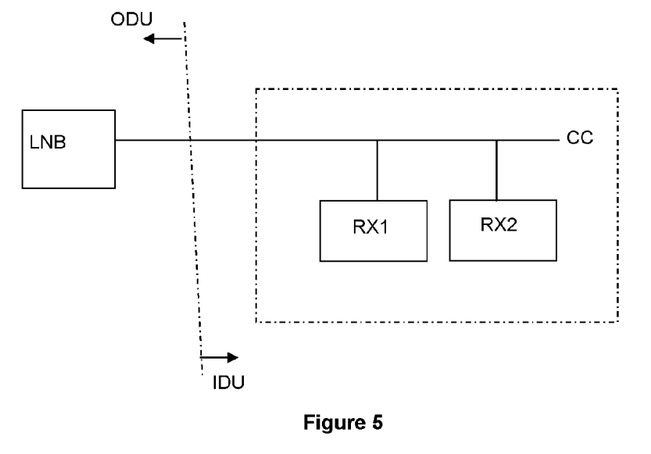
FIG. 5, showing a system in which an embodiment of the present invention may be deployed.

FIG. 5 shows a system in which an embodiment of the present invention may be deployed. A primary receiver (RX1) is connected to the LNB (LNB) of the outdoor unit via a common cable (CC) for receiving satellite content. A secondary receiver (RX2) is also connected to the LNB via the common cable (CC) for receiving satellite content. Both receivers have tuners for selecting which part of the L-Band each one receives. The primary receiver is configured to send commands to the LNB via the common cable to configure which transponder frequencies are to be down-converted to which part of the L-Band. One way of configuring the primary receiver to send commands to the LNB is for the primary receiver to have a processor to read the commands from a memory and send them to the LNB. Another way is for the primary receiver to have a dedicated controller to handle all functions related to the sending of commands or instructions to the LNB.

According to embodiments of the invention, a Message User-Band is chosen and the primary receiver instructs the LNB to down-convert at least two predetermined message transponders to that same Message User-Band. The secondary receiver (RX2) can tune to the Message User-Band and can receive the signal that appears there. In some embodiments the secondary receiver has two tuners and so can receive the Massage User-Band and a user band for "normal" satellite content simultaneously. According to other embodiments, the secondary receiver has to poll the Message User-Band or otherwise switch periodically to the Message User-Band.

Different message transponders are identifiable by decoding their signals and inspecting a part of their transport streams for example. Receivers, both primary and secondary, as in the state of the art, are equipped with demodulators for demodulating the received selected L-Band signals and with decoders to decode the demodulated signal. The demodulated signal is usually a transport stream when the receiver is for audio/video content.

Each message transponder represents a different symbol and a succession of symbols can be constructed, by the primary receiver to form messages for the secondary receiver at the agreed Message User-Band. Access control can be provided in this way whereby the secondary receiver can be excluded from decrypting the "normal" satellite content if it does not receive certain messages from the primary receiver. In other words, if the secondary receiver cannot prove that it shares the same cable as the primary receiver and the LNB, then it is assumed that it is not in the same premises as the primary receiver, contrary to the conditions of its deployment.

Figure 6:
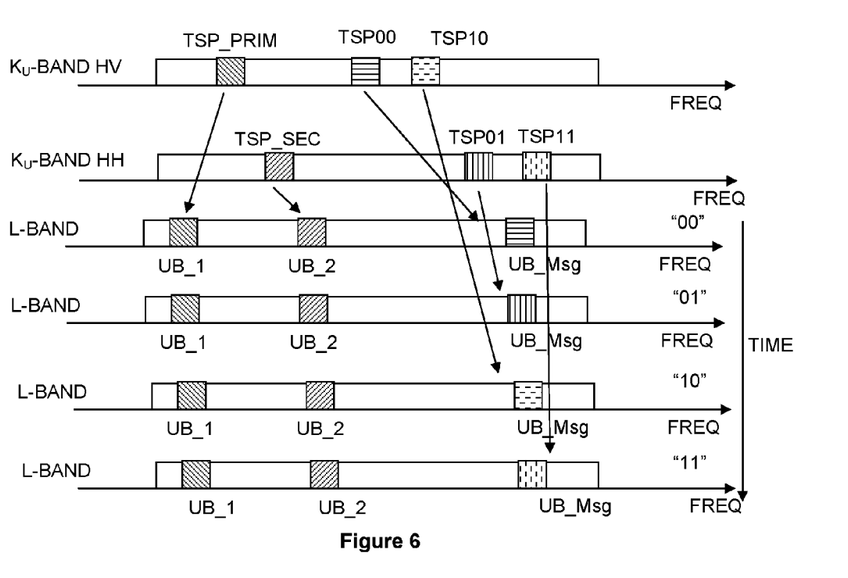
FIG. 6, showing how, according to an embodiment of the present invention, four different multi-bit symbols may be modulated onto the message user-band in a system comprising four predetermined message transponders.

In the examples of the embodiments described so far, the symbols making up the messages were 1 bit long. For example a "0" symbol or a "1" symbol were described and the message was a succession of bits. According to other embodiments, some configurations of LNB exist whereby more than four transponders can be down-converted by the same LNB or a plurality of LNBs within a same ODU. In these cases, by designating further transponders (i.e. more than 2) to serve as character coding transponders for building messages as described above, it is possible to code more than 1 bit per symbol, thereby increasing the message data rate (the frequency at which a complete message can be transferred) and therefore the message communication speed. In embodiments where one or more LNBs are used to down-convert signals from more than four transponders in total, it is possible to have more than one predetermined message transponder to represent a single symbol. In this way a symbol can be more than 1 bit long, making longer messages possible and/or allowing for faster transmission of messages. For example, four different transponders can be designated to be message transponders, where one is taken to represent a symbol "00", another to represent "01", another to represent "10" and another to represent "11". In such cases, instead of requiring eight phases of the message period to deliver 8 bits, the eight bits can now be delivered in 4 phases at a rate of two bits per phase. This is illustrated in FIG. 6.

According to yet another embodiment, eight transponders can be designated as being message transponders, each corresponding to a 3-bit symbol. Here, each of the eight message transponders may represent the following codes, respectively: 000, 001, 010, 011, 100, 101, 110, 111. Similarly, if sixteen message transponders were used, then 16 different 4-bit symbols could be covered by the sixteen message transponders. Whereas it would take 8 phases to deliver an 8-bit message using eight 1-bit symbols in a system having two message transponders, it would only take two phases to deliver the same message in a system having 16 message transponders. More generally speaking, it can be said that a system according to embodiments of the present invention can have $2^n$ message transponders and symbols have a number of bits equal to n, with n greater than or equal to 1.

According to an embodiment of the present invention, proximity enforcement (or verification) may be achieved by having the primary receiver periodically code the current date and the value of a reload counter using the LNB communication standard (e.g. DiSEqC commands) to select between Transponder0 and Transponder1 to send a security message for the secondary receiver as described above. Since the LNB serves only one structure or dwelling place (i.e. a place which can usually be considered as corresponding to a single household) this provides a means for the secondary receiver to prove that it is effectively located in the same household as the primary receiver. In other words, the secondary receiver can only receive such messages from the primary receiver, sent via the single cable using the LNB control commands, if the secondary receiver is actually connected to that same cable. If the proof is positive and the secondary receiver manages to receive (and perhaps decrypt or otherwise authenticate) such a security message, then the second receiver is allowed to continue to function normally at least for a pre-determined amount of time, after which another such proximity control procedure should be undertaken. In this case, the pre-determined amount of time could be based on the reload counter value sent in the message. The current date value sent in the message may be used to prevent replay. By current date, this could include any of year, month, day, hours, minutes or seconds. The counter reload could correspond to seconds, minutes, hours or days for example, depending on how fine a control is required. In order to continue being able to decrypt or otherwise present content, the secondary receiver has to perform the security check again before the reload counter times out or when the reload counter times out. Either way, the secondary receiver has to be able to receive messages periodically and therefore to periodically prove that it is still connected to the same cable as the primary receiver. As mentioned above, in a system in which the secondary receiver has a dual tuner, such proximity control procedures could take place more frequently since they use of the second tuner allows for the broadcast content to be continued to be received in a continuous, uninterrupted fashion. If the subscriber lends the secondary receiver (or a secondary smartcard) to a third party for use in a system not connected to the same cable as the primary receiver, the secondary receiver will not be able to receive the authorization messages and will therefore not be able to provide access to the broadcast content.

Since it is the operator who supplies the secondary receiver to subscribers, the operator may pre-configure the secondary receiver or a part of the receiver operable to function as a conditional access element (a security card or smartcard for example) such that the secondary receiver requires an authentication message from a primary receiver (or a particular primary receiver) as a condition for providing access to content.

The methods described above may be adapted to provide two-way half-duplex communication between the primary and secondary receivers. Consequently, this will be at a lower bit-rate than would be possible with some of the embodiments described above where a dual tuner is used in the secondary receiver, but such a scenario is still considered to be useful in certain cases.

Embodiments of the present invention may include LNBs which are configured according to the Unicable standard or to a standard other than Unicable, as long as the LNB command structure used in the standard allows for the messages as described above to be coded onto the shared cable i.e. the LNB should be able to receive commands from a receiver on the cable to select and switch between two transponders thereby causing them to have their $K_U$-Band signals down-converted onto the same pre-determined user-band (IFB Message Frequency in the L-Band) in a controlled manner. In LNBs which do not use the Unicable standard, the primary receiver live feed may become disrupted during the phases where the signal at the IFB message frequency is modulated. Consequently, solutions according to embodiments of the present invention may be deployed within households having simpler home installations than those which are possible using the Unicable standard.

The invention claimed is:

1. A primary satellite communications receiver for receiving at least one user-band signal from a plurality of user-band signals within a band of intermediate frequencies via a common cable from a low-noise block down-converter, comprising:
   a processor for providing instructions to the low-noise block down-converter via the common cable, the instructions operable to cause the low-noise block down-converter to down-convert, to one or more particular user-band signals, one or more corresponding radio frequency signals from one or more corresponding transponders from a plurality of transponders each providing radio frequency signals at different frequencies within a band of radio frequencies;
   wherein the processor is further configured to provide further instructions to the low-noise block-down-converter via the common cable, the further instructions operable to successively select either one or another message transponder from a predetermined plurality of message transponders, for down-converting of the selected message transponder's radio frequency signal to one pre-determined message user-band within the band of intermediate frequencies, the selection dependent on the values of successive symbols of a pre-determined message comprising a series of symbols, each of the predetermined plurality of message transponders' radio frequency signals being distinguishable from each other and traceable to its respective message transponder.

2. A secondary satellite communications receiver for receiving at least one user-band signal from a plurality of user-band signals within a band of intermediate frequencies via a common cable from a low-noise block down-converter for down-converting, to the band of intermediate frequencies, a plurality of radio frequency signals from a plurality of transponders each providing radio frequency signals at different frequencies within a band of radio frequencies, the secondary satellite communications receiver comprising:
   at least a first tuner for selectively receiving at least a first user-band signal from the plurality of user-band signals;
   at least a first demodulator for demodulating the selected first user-band signal;
   at least a first decoder for decoding at least the demodulated first user-band signal to provide a first transport stream; and
   a processor for processing at least the first transport stream;
   wherein the secondary satellite communications receiver is further configured to:
   receive a further user-band signal from the plurality of user-band signals at a pre-determined message user-band within the band of intermediate frequencies via the common cable from the low-noise block down-converter;
   demodulate, decode and process the further user-band signal to obtain a plurality of further transport streams;
   trace each one from the plurality of further transport streams to one from a plurality of pre-determined message transponders within the plurality of transponders, each message transponder corresponding to a predetermined symbol; and
   reconstruct a message comprising a series of successive symbols corresponding to the traced message transponders.

3. The secondary satellite communications receiver according to claim 2, further configured to provide access to a content comprised within the first transport stream in response to the reconstructed message corresponding to a predetermined authorization message.

4. The secondary satellite communications receiver according to claim 2, wherein the first tuner is further configured to be controlled to switch between reception of the first user-band signal to reception of the message user-band signal.

5. The secondary satellite communications receiver according to claim 2, further comprising a second tuner configured to continuously receive the message user-band signal.

6. A satellite communications consumer premises system comprising:
- a common cable for receiving a band of intermediate frequencies from a low-noise block down-converter, the band of intermediate frequencies comprising one or more user-band signals from a plurality of user-band signals;
- a primary satellite communications receiver for receiving at least one user-band signal from a plurality of user-band signals within a band of intermediate frequencies via a common cable from a low-noise block down-converter, comprising:
  - a processor for providing instructions to the low-noise block down-converter via the common cable, the instructions operable to cause the low-noise block down-converter to down-convert, to one or more particular user-band signals, one or more corresponding radio frequency signals from one or more corresponding transponders from a plurality of transponders each providing radio frequency signals at different frequencies within a band of radio frequencies;
  - wherein the processor is further configured to provide further instructions to the low-noise block-down-converter via the common cable, the further instructions operable to successively select either one or another message transponder from a predetermined plurality of message transponders, for down-converting of the selected message transponder's radio frequency signal to one pre-determined message user-band within the band of intermediate frequencies, the selection dependent on the values of successive symbols of a pre-determined message comprising a series of symbols, each of the predetermined plurality of message transponders' radio frequency signals being distinguishable from each other and traceable to its respective message transponder;
  - the primary satellite communications receiver configured to receive at least a first user-band signal from the plurality of user-band signals via the common cable; and
- a secondary satellite communications receiver according to claim 2, the secondary satellite communications receiver configured to receive at least a second user-band signal and a message user-band signal from a plurality of user-band signals via the common cable;
- wherein the secondary satellite communications receiver is configured to switch, at pre-determined intervals, from receiving the second user-band signal to receiving the message user-band signal.

7. In a satellite communications consumer premises system according to claim 6, a method for enforcing an authorization policy which requires a physical proximity condition between a first receiver and a second receiver to be met for access to a received content to be granted, the method comprising:
- receiving a content from the common cable at a first user-band by the second receiver;
- programming the low-noise block down-converter, by the first receiver via the common cable, to generate a modulated signal on the common cable at a pre-determined message user-band by selectively switching between at least two message transponders based on the values of successive symbols of the authorization message, the first and second message transponders transmitting signals which can be distinguished from each other and traceable to their respective transponders;
- decoding, by the second receiver, the modulated signal to recover the authorization message; and
- providing the second receiver access to the received content only if the second receiver receives the authorization message.

8. The satellite communications consumer premises system according to claim 6, wherein the secondary satellite communication receiver is further configured to provide access to a content comprised within the first transport stream in response to the reconstructed message corresponding to a predetermined authorization message.

9. The satellite communications consumer premises system according to claim 6, wherein the secondary satellite communication receiver is further configured to provide access to a content comprised within the first transport stream in response to the reconstructed message corresponding to a predetermined authorization message.

10. The satellite communications consumer premises system according to claim 6, wherein the secondary satellite communication receiver further comprises a second tuner configured to continuously receive the message user-band signal.

11. A satellite communications consumer premises system comprising:
- a common cable for receiving a band of intermediate frequencies from a low-noise block down-converter, the band of intermediate frequencies comprising one or more user-band signals from a plurality of user-band signals;
- a primary satellite communications receiver for receiving at least one user-band signal from a plurality of user-band signals within a band of intermediate frequencies via a common cable from a low-noise block down-converter, comprising:
  - a processor for providing instructions to the low-noise block down-converter via the common cable, the instructions operable to cause the low-noise block down-converter to down-convert, to one or more particular user-band signals, one or more corresponding radio frequency signals from one or more corresponding transponders from a plurality of transponders each providing radio frequency signals at different frequencies within a band of radio frequencies;
  - wherein the processor is further configured to provide further instructions to the low-noise block-down-converter via the common cable, the further instructions operable to successively select either one or another message transponder from a predetermined plurality of message transponders, for down-converting of the selected message transponder's radio frequency signal to one pre-determined message user-band within the band of intermediate frequencies, the selection dependent on the values of successive symbols of a pre-determined message comprising a series of symbols, each of the predetermined plurality of message transponders' radio frequency signals being distinguishable from each other and traceable to its respective message transponder;
the primary satellite communications receiver configured to receive at least a first user-band signal from the plurality of user-band signals via the common cable; and
a secondary satellite communications receiver according to claim 2, the secondary satellite communications receiver configured to receive at least a second user-band signal and a message user-band signal from a plurality of user-band signals via the common cable.

12. In a satellite communications consumer premises system according to claim 11 a method for enforcing an authorization policy which requires a physical proximity condition between a first receiver and a second receiver to be met for access to a received content to be granted, the method comprising:
receiving a content from the common cable at a first user-band by the second receiver;
programming the low-noise block down-converter, by the first receiver via the common cable, to generate a modulated signal on the common cable at a pre-determined message user-band by selectively switching between at least two message transponders based on the values of successive symbols of the authorization message, the first and second message transponders transmitting signals which can be distinguished from each other and traceable to their respective transponders;
decoding, by the second receiver, the modulated signal to recover the authorization message; and
providing the second receiver access to the received content only if the second receiver receives the authorization message.

13. The satellite communications consumer premises system according to claim 11, wherein the secondary satellite communication receiver is further configured to provide access to a content comprised within the first transport stream in response to the reconstructed message corresponding to a predetermined authorization message.

14. The satellite communications consumer premises system according to claim 11, wherein the first tuner of the secondary satellite communication receiver is further configured to be controlled to switch between reception of the first user-band signal to reception of the message user-band signal.

15. The satellite communications consumer premises system according to claim 11, wherein the secondary satellite communication receiver further comprises a second tuner configured to continuously receive the message user-band signal.

16. A satellite communications reception system comprising:
a satellite communications outdoor unit comprising:
a satellite dish for receiving radio frequency signals from a plurality of transponders each providing radio frequency signals at different frequencies within a band of radio frequencies; and
a low-noise block down-converter for amplifying the received radio frequency signals and down-converting the amplified signals to a plurality of user-band signals in a band of intermediate frequencies on a common cable; and
a satellite communications consumer premises system comprising:
a primary satellite communications receiver configured to receive at least a first user-band signal from the plurality of user-band signals via the common cable; and
a secondary satellite communications receiver configured to receive at least a second user-band signal and a message user-band signal from a plurality of user-band signals via the common cable;
wherein the satellite communications outdoor unit is connected to the satellite communications consumer premises system via the common cable and the primary satellite communications receiver is configured to provide instructions to the low-noise block-down-converter via the common cable, the instructions operable to successively select either one or another message transponder from a predetermined plurality of message transponders, for down-converting of the selected message transponder's radio frequency signal to one predetermined message user-band within the band of intermediate frequencies, the selection dependent on the values of successive symbols of a pre-determined message comprising a series of symbols, each of the predetermined plurality of message transponders' radio frequency signals being distinguishable from each other and traceable to its respective message transponder.

17. A satellite communications system comprising:
an antenna configured to receive radio frequency signals at different frequencies within a band of radio frequencies from a plurality of satellite transponders, said plurality of satellite transponders including at least two to the power n predetermined message transponders each configured to transmit signals which allow for each of the message transponders to be uniquely identified, where n is a non-negative integer; and
a low-noise block down-converter (LNB) connected to receive signals from the antenna, the LNB being configured to successively down-convert signals from the predetermined message transponders to a single predetermined intermediate message frequency band and to down-convert other signals from other transponders to intermediate frequency bands different from the predetermined intermediate message frequency band.

18. The satellite communication system of claim 17, further comprising:
a set top box connected to the LNB, the set top box being configured to provide instructions to the LNB to control the number in which the LNB successively down-converts the signals from the predetermined message transponders to the single predetermined intermediate frequency band.

19. The satellite communication system of claim 17, further comprising:
A plurality of transponders configured to transmit the radio frequency signal to the antenna.

* * * * *